Dec. 7, 1971   R. G. DAUBENEY ETAL   3,624,896
METHOD OF MAKING AN ELECTRICAL MOVING COIL DEVICE
Filed June 23, 1969

INVENTOR
ROGER GILES DAUBENEY
& GEORGE LITHGOW SHORE
BY
Young + Thompson
ATTORNEYS 3,624,896
METHOD OF MAKING AN ELECTRICAL
MOVING COIL DEVICE
Roger Giles Daubeney, Charlton Kings, and Anthony George Lithgow Shore, Winchcombe, England, assignors to Dowty Technical Developments Limited, Brockhampton, England
Filed June 23, 1969, Ser. No. 835,684
Claims priority, application Great Britain, June 26, 1968, 30,403/68
Int. Cl. H02k 15/00
U.S. Cl. 29—596
8 Claims

ABSTRACT OF THE DISCLOSURE

A spring mounting for an electrical moving coil device comprising a plurality of metallic spring blades extending from a fixed support to the moving coil carrying member to locate the moving coil carrying member and the moving coil for reciprocation in a magnetic field, the said spring blades also serving as electrical connections for coil. The moving coil device may form part of a force motor for use in a pressure regulating valve forming part of an electro-hydraulic or electropneumatic servo-valve.

---

This invention relates to an electrical moving-coil device and more particularly it relates to a moving coil and a mounting to support the coil for movement in a magnetic field. Such a moving coil may form part of a force motor for use in a pressure-regulating valve forming part of an electro-hydraulic servo-valve.

In accordance with the present invention, a mounting for a moving coil comprises a plurality of metallic spring elements extending from a support to a moving-coil-carrying member to carry the latter for substantially linear reciprocatory movement and to convey electric current to and from the latter.

Also in accordance with the invention, a moving coil and a mounting therefor comprises a plurality of metallic spring elements extending from a support to a member carrying the moving coil such that the coil is capable of substantially linear reciprocatory movement, said spring elements serving as the electrical connections for the coil.

The moving-coil-carrying member may carry an obturating member for co-operation with a nozzle, fluid at pressure being supplied through a restrictor to the nozzle whereby the spacing between the obturator and the nozzle as determined by the moving coil will determine the pressure of fluid within the nozzle.

Further in accordance with the present invention a method of assembly of a mounting for a moving coil comprises forming spring blades in a piece of sheet metal, mounting an insulating coil-carrying member at one end of each blade, mounting an insulating support at the other end of each blade, and removing selected parts of the sheet metal so as to divide the piece of sheet metal into two or more parts leaving the blade or blades of one part secured to the blade or blades of another part by insulating material.

The coil former having the coil wound theeron, may then be secured to the coil-carrying member and the coil may then be connected to the end of the blades held adjacent thereto.

The insulating support may comprise a ring of insulating material disposed concentrically around the coil.

The insulating support may comprise a pair of similarly shaped members which are secured adhesively on either side of the piece of sheet metal, the piercing of the insulating support being effected at selected positions either before or after securing to the piece of sheet metal. Where the two members are pierced before assemblying together on the piece of sheet metal, the proportion of sheet metal appearing within the pierced holes may be cut away by passing a piercing instrument through these holes.

Preferably the piece of sheet metal includes small bridges of metal adapted to fit against the already pierced holes in the insulating members, these bridges being cut away by the piercing instrument after the insulating members have been secured to the sheet metal.

Preferably the piercing instrument used to remove these bridges operates by spark erosion although any other suitable instrument may be employed.

Two embodiments of the invention will now be particularly described with refeernce to the accompanying drawings in which.

The illustrated spring mounting and the moving coil as shown in FIGS. 1–5 are intended particularly for use in the electro-hydraulic-servo-valve disclosed in Andrews' application (2,030), Goddard's application (2,031) and Shore's application (2,032) all of even date herewith or Andrews' application 615,150.

Figure 1:
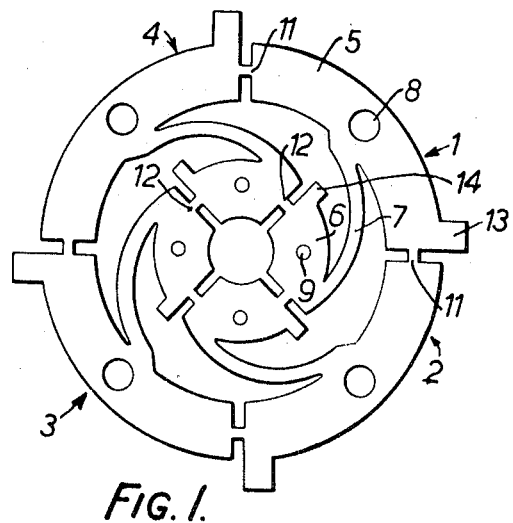
FIG. 1 is a plan view of a piece of sheet metal prepared for assembly.

Reference is made initially to FIG. 1 of the drawings which shows a plan view of the piece of sheet metal in the form to which it is initially cut. The sheet metal employed is one which combines good electrical conductivity together with good spring characteristics such as, for example, beryllium-copper. The process of cutting the piece of sheet metal into shape is preferably effected by etching in order to avoid any slight bending of the sheet metal which could result during mechanical cutting. The piece of sheet metal is formed in four identically similar parts 1, 2, 3 and 4 and the part 1 only will be described in detail.

This part 1 comprises an outer member 5, an inner member 6, and a spring blade 7 connecting the inner and the outer members together. The blade 7 is arranged spirally with reference to the centre of the piece of sheet metal. For location purposes the outer member 5 is provided with a small hole 8 whilst the inner member is provided with a small hole 9.

The whole piece of sheet metal is formed in one piece by providing small bridges of metal 11 between adjacent pairs of the outer members and small bridges of metal 12 between adjacent pairs of the inner members. Each outer member 5 includes an electrical connecting tag 13 and each inner member 6 also includes an electrical connecting tag 14.

Figure 3:
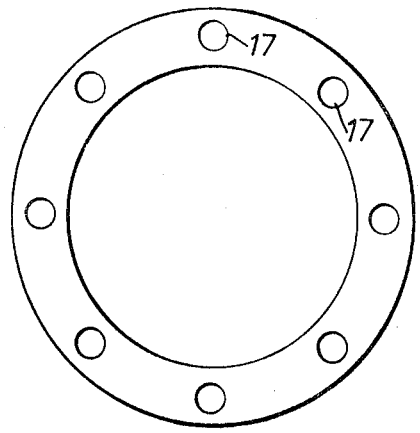
FIGS. 3, 4 and 5 are plan views of insulating members employed in FIG. 2.

The insulating support is formed by two similar pieces of sheet insulating-material 15 and 16, one being shown in plan in FIG. 3. Each insulating-member 15 and 16 is provided with eight holes 17 at equally-spaced positions around its periphery. Of the holes 17 four are intended to assist in location of the members 15 and 16 on to the holes 8 in the piece of sheet metal. The remainder of the four holes 17 are arranged to take up positions adjacent the four bridges 11.

Figure 2:
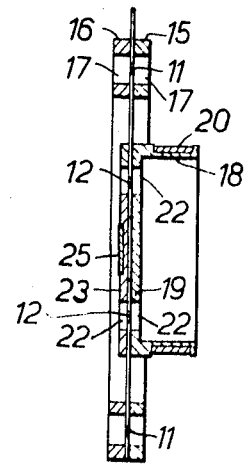
FIG. 2 is a cross-section through the completed assembly of moving coil and spring support.
Figure 4:
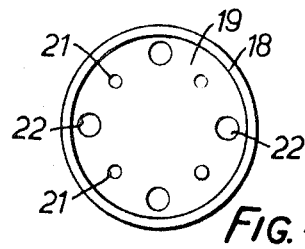
Figure 5:
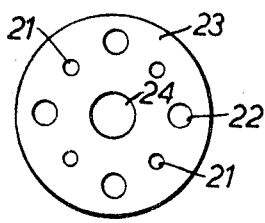

The insulating coil-carrying member is illustrated in FIGS. 2, 4 and 5 and comprises a circular disc 19 and a circular disc 23 intended to fit on opposite sides over the inner members 6 of the piece of sheet metal. The discs 19 and 23 each include four equally-spaced-apart small holes 21 intended to locate with the holes 9 of the piece of sheet metal. Each disc 19 and 23 also includes four larger holes 22 which are positioned over the four bridges 12 when the two discs are secured in position. The coil former 18 may be integral with the disc 19 or it may be adhesively secured thereto. The coil 20 is wound on the former 18 and the winding may take any form appropriate to the required electrical characteristics. The coil itself is impregnated with an adhesive which secures it rigidly to the former 18 to facilitate the transfer of mechanical thrust from the coil to the former.

In assembling the moving coil and the spring mounting, the two pieces of insulating material 15 and 16 are secured by adhesive respectively to the two sides of the outer portion 5 of sheet metal, the holes 17 being located on the holes 8 by removable dowel pins. Also the discs 19 and 23 are adhesively secured respectively to the two sides of the inner part of the piece of sheet metal, the holes 21 being located on the holes 9 by removable dowels. The bridges 11 and 12 that now appear within the holes 17 and 22 are cut away by any convenient piercing tool, and for preference a tool using the principle of spark erosion. When the bridges 11 and 12 are removed the four parts 1, 2, 3 and 4 of the piece of sheet metal are rigidly held relatively to one another by the insulating material of the insulating support and of the insulating coil-carrying member. The coil former 18 carrying the coil 20 will then be secured adhesively to the disc 19 and the coil connected by soldering to the tags 14.

A pair of such completed coil-and-spring mounting units as shown in FIGS. 1–5 may be used in the electro-hydraulic-servo-valve shown in our Andrew's application 615,150, the tags 13 having soldered thereto connections by which electricity may flow to and from the coil on the former 18. The insulating disc 23 of each unit may have an insert 25 secured adhesively in the hole 24 to cooperate with the associated nozzle in the electro-hydraulic-servo-valve to control the pressure within the nozzle.

Figure 6:
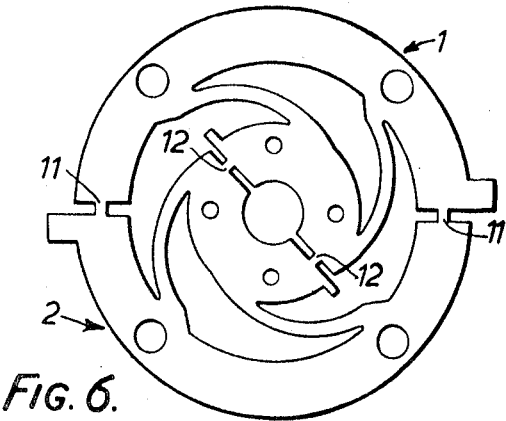
FIG. 6 is a plan view of an alternative form of sheet metal prepared for assembly.

The coil and spring mounting units shown in FIG. 1, 2, 3, 4 and 5 is intended for use where the coil comprises two separate windings insulated from one another, there being provided four connecting tags 14, four spring blades 7 and four connecting tags 13 so that two electrical connections may be provided for each winding on the coil.

Where the coil comprises only one winding, the initial cutting of the piece of sheet metal may be similified to the form shown in FIG. 6 where the piece of sheet metal is formed in two identically similar parts 1 and 2 joined by two small bridges 11 between the outer members and two small bridges 12 between the inner members. Otherwise the shape and construction is exactly as described with reference to FIG. 1. The piece of sheet metal of FIG. 6 is assembled exactly in the manner described with reference to FIGS. 1–5 the only difference being that only the two bridges 11 and the two bridges 12 need to be removed by the piercing tool. This leaves only the two pieces 1 and 2 of the sheet metal rigidly held in the insulating members 15 and 16 and 19 and 23.

Whilst in the described embodiments the insulating members 15, 16, 19 and 23 have been adhesively secured to the sheet metal it is within the scope of this invention to use any other method of securing such for example as riveting.

We claim:

1. The method of assembly of a moving coil and its mounting comprising forming spring blades integrally from one piece of sheet metal, mounting an insulating coil carrying member on the blades so as to rigidly hold the ends of the blades adjacent to the coil carrying member, rigidly mounting the ends of the blades remote from the coil carrying member in an insulating support adapted for fixed mounting in its operative position, and piercing through parts of at least one of the coil carrying member and the insulating support at a selected position or positions so as to divide the piece of sheet metal into two or more electrically isolated parts leaving the blades rigidly secured together by insulating material at the coil carrying member and at the insulating support.

2. The method of assembly as claimed in claim 2 wherein the coil former having the coil wound thereon is secured to the coil carrying member after the latter has been secured to the piece of sheet metal.

3. The method of assembly as claimed in claim 1 wherein the insulating support comprises a ring of insulating material disposed concentrically around the coil carrying member.

4. The method of assembly as claimed in claim 3 wherein the insulating support comprises a pair of similarly shaped annular members which are secured adhesively on either side of the piece of sheet metal, piercing of the insulating support being effected at selected positions before securing to the piece of sheet metal.

5. The method of assembly as claimed in claim 4 wherein the proportion of the sheet metal appearing in the pierced holes in the insulating support is cut away by passing a piercing instrument through these holes.

6. The method of assembly as claimed in claim 5 wherein the piercing instrument operates by spark erosion.

7. The method of assembly as claimed in claim 5 wherein the piece of sheet metal includes small bridges of metal adapted to fit across the already pierced holes in the insulating member, these bridges being cut away by the piercing instrument after the insulating support has been secured to the sheet metal.

8. The method of assembly as claimed in claim 1 wherein the insulating coil carrying member comprises a pair of discs of insulating material secured adhesively on either side of the piece of sheet metal, the piercing of the coil carrying member being effected at selected positions before securing to the piece of sheet metal.

References Cited

UNITED STATES PATENTS

| | | | |
|---|---|---|---|
| 1,757,385 | 5/1930 | Preator et al. | 179—115.5 VC |
| 2,118,862 | 5/1938 | Rayment et al. | 310—27 |
| 2,556,816 | 6/1951 | Lukacs | 335—231 X |
| 2,751,573 | 6/1956 | Millington | 310—27 X |

JOHN F. CAMPBELL, Primary Examiner

C. E. HALL, Assistant Examiner

U.S. Cl. X.R.

29—414, 416, 418, 602; 310—13, 27; 335—150, 222; 336—130, 136